(12) United States Patent
Abe

(10) Patent No.: US 8,355,048 B2
(45) Date of Patent: Jan. 15, 2013

(54) SUBJECT TRACKING COMPUTER PROGRAM PRODUCT, SUBJECT TRACKING DEVICE AND CAMERA

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 724 days.

(21) Appl. No.: 12/449,403

(22) PCT Filed: Mar. 13, 2008

(86) PCT No.: PCT/JP2008/054606
§ 371 (c)(1),
(2), (4) Date: Aug. 6, 2009

(87) PCT Pub. No.: WO2008/114683
PCT Pub. Date: Sep. 25, 2008

(65) Prior Publication Data
US 2010/0165113 A1    Jul. 1, 2010

(30) Foreign Application Priority Data
Mar. 16, 2007    (JP) .................................. 2007-068801

(51) Int. Cl.
*G06K 9/66*    (2006.01)
(52) U.S. Cl. .......................... 348/169; 382/103; 382/209
(58) Field of Classification Search .................. 348/169; 382/103, 209, 217
See application file for complete search history.

(56) References Cited

U.S. PATENT DOCUMENTS

| | | | |
|---|---|---|---|
| 5,627,915 A * | 5/1997 | Rosser et al. .................. 382/219 |
| 5,943,442 A * | 8/1999 | Tanaka et al. .................. 382/216 |
| 6,542,639 B2 * | 4/2003 | Konoshima et al. .......... 382/218 |
| 6,687,386 B1 | 2/2004 | Ito et al. |
| 8,131,014 B2 * | 3/2012 | Abe ............................... 382/103 |
| 8,170,277 B2 * | 5/2012 | Michimoto et al. .......... 382/103 |
| 8,194,134 B2 * | 6/2012 | Furukawa ...................... 348/169 |
| 2004/0179716 A1 | 9/2004 | Tafuku et al. |
| 2005/0052533 A1 * | 3/2005 | Ito et al. .......................... 348/169 |
| 2006/0104517 A1 | 5/2006 | Ko et al. |
| 2009/0028440 A1 * | 1/2009 | Elangovan et al. ............ 382/216 |

FOREIGN PATENT DOCUMENTS

| | | |
|---|---|---|
| JP | A-2001-060269 | 3/2001 |
| JP | A-2004-234494 | 8/2004 |
| JP | A-2005-346425 | 12/2005 |
| JP | A-2006-146922 | 6/2006 |

* cited by examiner

*Primary Examiner* — Kevin Bates
(74) *Attorney, Agent, or Firm* — Oliff & Berridge, PLC

(57) ABSTRACT

A subject tracking computer program product containing a subject tracking program executed by a computer in order to track movement of a subject through a plurality of input images input in time series. The subject tracking program enables the computer to execute: a template matching step through which each input image is matched with a plurality of template images at various magnification factors through template matching, a template image among the plurality of template images achieving a highest level of similarity to an image within a specific area in the input image is selected as a chosen template image and the specific are in the input image is extracted as a match-up are; a decision step through which a decision is made as to whether or not matching results obtained through the template matching step satisfy an update condition for updating the plurality of template images; and an update step through which at least one of the plurality of template images is updated upon deciding through the decision step that the update condition is satisfied.

11 Claims, 7 Drawing Sheets

SUBJECT TRACKING COMPUTER PROGRAM PRODUCT, SUBJECT TRACKING DEVICE AND CAMERA

TECHNICAL FIELD

Figure 1:
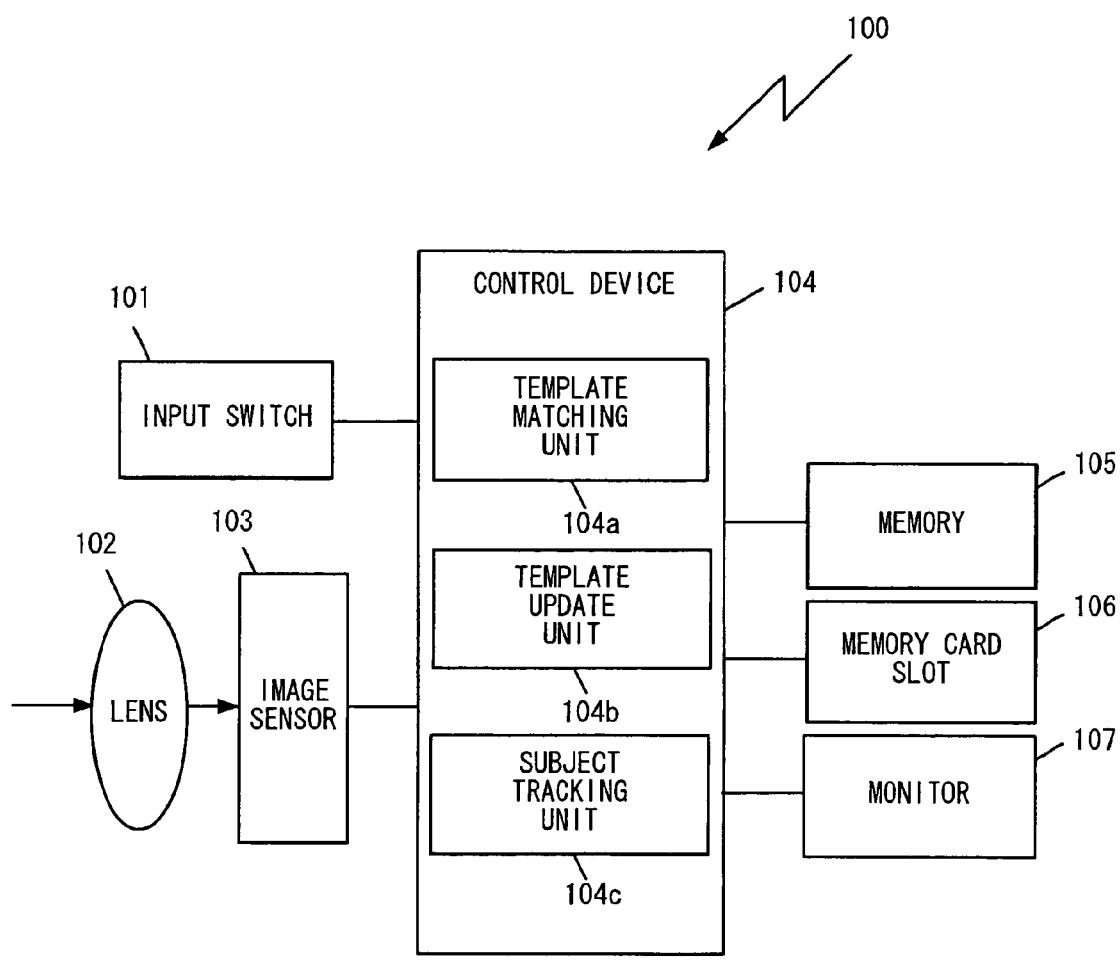

The present invention relates to a subject tracking computer program product containing a subject tracking program based upon which a photographic subject is tracked from one image to another through a plurality of input images, a subject tracking device and a camera.

BACKGROUND ART

There is an object tracking device known in the related art. The object tracking device executes matching processing by comparing the input image in each frame with a plurality of template images obtained at different times. It then designates the area of the input image achieving the highest level of match as a template matching position and designates the image at the template matching position as a new template image for an update so as to accurately track the tracking target object, which may change its shape (see patent reference 1).

Patent reference 1: Japanese Laid-Open Patent Publication No. 2001-60269

DISCLOSURE OF THE INVENTION

Problems to Be Solved by the Invention

However, there is an issue to be addressed in the object tracking device in the related art in that since the plurality of template images are updated each time the matching processing is executed in correspondence to the input image in a given frame, template images will change considerably, making it rather difficult to assure stable template matching processing. This issue may become particularly challenging in applications in which the subject racking device is adopted in a camera, since the size of a photographic subject moving along the optical axis of the camera (closer to or further away from the camera) will change and lead to instability in template matching.

Means for Solving the Problems

A subject tracking computer program product according to a first aspect of the present invention contains a subject tracking program executed by a computer in order to track movement of a subject through a plurality of input images input in time series. The subject tracking program enables the computer to execute: a template matching step through which each input image is matched with a plurality of template images at various magnification factors through template matching, a template image among the plurality of template images achieving a highest level of similarity to an image within a specific area in the input image is selected as a chosen template image and the specific area in the input image is extracted as a match-up area; a decision step through which a decision is made as to whether or not matching results obtained through the template matching step satisfy an update condition for updating the plurality of template images; and an update step through which at least one of the plurality of template images is updated upon deciding through the decision step that the update condition is satisfied.

According to a second aspect of the present invention, in the subject tracking computer program product according to the first aspect, it is preferable that the plurality of template images include a current chosen template image selected as the chosen template image as the plurality of template images are updated through the update step, an enlarged template image obtained by enlarging the current chosen template image by a predetermined magnification factor and a reduced template image obtained by reducing the current chosen template image by a predetermined magnification factor.

According to a third aspect of the present invention, in the subject tracking computer program product according to second aspect, it is preferable that, in the decision step, the decision as to whether or not the update condition is satisfied is made based upon a criterion that either the enlarged template image or the reduced template image has been consecutively selected as the chosen template image a predetermined number of times or more.

According to a fourth aspect of the present invention, in the subject tracking computer program product according to the second aspect, it is preferable that, in the decision step, the decision as to whether or not the update condition is satisfied is made based upon a criterion that levels of similarity determined in correspondence to either the enlarged template image or the reduced template image having been consecutively selected as the chosen template image a predetermined number of times or more, are all equal to or greater than a predetermined similarity level value or that an average of the said levels of similarity is equal to or greater than the predetermined similarity level value.

A subject tracking computer program product according to a fifth aspect of the present invention contains a subject tracking program executed by a computer in order to track movement of a subject through a plurality of input images input in time series. The subject tracking program enables the computer to execute: a template matching step through which each input image is matched through template matching with a plurality of template images including a plurality of template images (magnification factor-varied template images) at various magnification factors and a plurality of template images (time-lagged template images) obtained at different time points, a template image among the plurality of template images achieving a highest level of similarity to an image within a specific area in the input image is selected as a chosen template image and the specific area in the input image is extracted as a match-up area; a decision step through which a decision is made as to whether or not matching results obtained through the template matching step satisfy an update condition for updating the plurality of template images; and an update step through which at least one of the plurality of template images is updated upon deciding through the decision step that the update condition is satisfied.

According to a sixth aspect of the present invention, in the subject tracking computer program product according to the fifth aspect, it is preferable that the plurality of magnification factor-varied template images include a current chosen template image selected as the chosen template image as the plurality of template images are updated through the update step, an enlarged template image obtained by enlarging the current chosen template image by a predetermined magnification factor and a reduced template image obtained by reducing the current chosen template image by a predetermined magnification factor; and the plurality of time-lagged template images include a previous chosen template image having been set as the current chosen template image until the plurality of template images are updated through the update step, a new chosen template image constituted with an image contained in the match-up area when the plurality of template images are updated through the update step and an update-exempt template image having been obtained at an earliest time point among the plurality of template images, which is not updated through the update step.

According to a seventh aspect of the present invention, in the subject tracking computer program product according to the fifth aspect, it is preferable that the plurality of time-lagged template images include a previous chosen template image having been set as the current chosen template image until the plurality of template images are updated through the update step, a new chosen template image constituted with an image contained in the match-up area when the plurality of template images are updated through the update step and an update-exempt template image having been obtained at an earliest time point among the plurality of template images, which is not updated through the update step; and the plurality of magnification factor-varied template images include the new chosen template image, an enlarged template image obtained by enlarging the new chosen template image by a predetermined magnification factor and a reduced template image obtained by reducing the new chosen template image by a predetermined magnification factor.

According to an eighth aspect of the present invention, in the subject tracking computer program product according to the sixth or seventh aspect, it is preferable that, in the decision step, the decision as to whether or not the update condition is satisfied is made based upon a criterion that any one of the previous chosen template image, the new chosen template image, the enlarged template image, the reduced template image and the update-exempt template image has been consecutively selected as the chosen template image a predetermined number of times or more.

According to a ninth aspect of the present invention, in the subject tracking computer program product according to the sixth or seventh aspect, it is preferable that, in the decision step, the decision as to whether or not the update condition is satisfied is made based upon a criterion that levels of similarity determined in correspondence to any one of the previous chosen template image, the new chosen template image, the enlarged template image, the reduced template image and the update-exempt template image having been consecutively selected as the chosen template image a predetermined number of times or more are all equal to or greater than a predetermined similarity level value or that an average of the said levels of similarity is equal to or greater than a predetermined similarity level value.

According to a tenth aspect of the present invention, in the subject tracking computer program product according to any one of the first through ninth aspects, it is preferable that the plurality of template images at various magnification factors are either a plurality of template images of uniform template image size, each obtained by adjusting an image magnification factor alone, or a plurality of template images each obtained by adjusting the image magnification factor and assuming a template image size adjusted in correspondence to the adjusted magnification factor.

A subject tracking device according to an eleventh aspect comprises an execution unit that executes the program contained in the subject tracking computer program product according to any one of the first through tenth aspects.

A camera according to a twelfth aspect of the present invention comprises: an imaging unit that captures a subject image and outputs image signals; and an execution unit that executes the program contained in the computer program product according to any one of the first through tenth aspect.

Effect of the Invention

The present invention enables stable template matching even when the subject moves along the optical axis of the camera.

BRIEF DESCRIPTION OF THE DRAWINGS (FIG. 1) A block diagram showing the structure of a camera embodying the subject tracking device (FIG. 2) Specific examples of template images in reference to which a first embodiment is described (FIG. 3) A specific example of a target image captured as the subject has moved closer to the camera (FIG. 4) A flowchart of the processing executed in the camera 100

(FIG. 5) Specific examples of template images in reference to which a second embodiment is described (FIG. 6) A block diagram showing the structure of a security system embodying the subject tracking device (FIG. 7) An illustration showing how the program may be provided to a personal computer

BEST MODE FOR CARRYING OUT THE INVENTION

—First Embodiment—

FIG. 1 is a block diagram showing the structure of the subject tracking device achieved as a camera in the first embodiment of the present invention. The camera 100 comprises an input switch 101, a lens 102, an image sensor 103, a control device 104, a memory 105, a memory card slot 106 and a monitor 107.

The input switch 101 includes various input members operated by the user. The input members included in the input switch 101 may be, for instance, a shutter release switch and various operation buttons via which the digital camera 100 is operated.

While the lens 102 is constituted with a plurality of optical lens groups, the plurality of optical lens groups are represented by a single lens in FIG. 1. The image sensor 103, constituted with, for instance, a CCD or a CMOS, obtains an image by capturing a subject image formed via the lens 102 and outputs image data expressing the captured image to the control device 104. It is to be noted that the image sensor 103 in the camera 100 in the first embodiment captures the subject image as the user presses the shutter release button included in the input switch 101. At this time, a single image may be captured as a still image at the time point at which the shutter release button is pressed or a dynamic image may be obtained by capturing a plurality of successive frames over predetermined time intervals during the period of time elapsing after the initial press of the shutter release button and the next press of the shutter release button.

The control device 104, constituted with a CPU, memory and other peripheral circuits, outputs the image data (still image data or dynamic image data) input thereto from the image sensor 103, to the monitor 107 where the image is brought up on display and also stores the image data into a memory card loaded in the memory card slot 106.

A template matching unit 104a, a template update unit 104b and a subject tracking unit 104c are also included as functional units in the control device 104. Through the processing executed by these functional units, frame-to-frame tracking of a subject present in the images in the individual frames constituting dynamic image data input from the image sensor 103 is achieved. The following is a description of the frame-to-frame subject tracking processing executed when such dynamic image data are input from the image sensor 103.

The template matching unit 104a executes matching calculation for the image data (target image) in each of image data frames input in time series from the image sensor 103 by using a plurality of template images in reference to which the template matching processing is executed. While methods that may be adopted in the template matching processing are of the known art and are, therefore, not described in detail, the template matching may be executed by adopting Correlation Algorithm or Sequential Similarity Detection Algorithm.

Namely, the template matching unit 104a sets a rectangular frame to define a target area on the target image, matches the image contained therein with a template image and shifts the target image position within the target image by a predetermined extent, e.g., by one pixel at a time, to calculate the level of similarity between the image within each target area position and the template image. Then, based upon the results of the template matching processing executed over the entire target image, the template matching unit 104a extracts the rectangular frame corresponding to a specific area containing the image achieving the highest level of similarity to the template image within the target image.

The subject tracking unit 104c tracks the area extracted by the template matching unit 104a from one frame to another so as to track the tracking target subject in the dynamic image data input in time series from the image sensor 103.

If the subject in the target images moves along the optical axis of the camera 100, i.e., if the subject moves closer to or further away from the camera 100, or the camera zooms in or out on the subject, the size of the subject changes from one frame to the next. For instance, as the subject, i.e., the infant in the target image shown in FIG. 2(*a*), keeps moving toward the camera 100, the size of the infant in the subsequent target image taken later will be greater, as shown in FIG. 3, compared to the size of the infant in FIG. 2(*a*).

Under such circumstances, the difference between the size of the subject in the target image and the size of the subject in the template image increases as time elapses, and thus, if the same template image is continuously used, the matching accuracy will degrade due to the gradual decrease in the level of similarity between the template image and the corresponding target area. Accordingly, in order to prevent such a decrease in the matching accuracy, a plurality of templates assuming different magnification factors (enlarging factors or reducing factors) are prepared and the template matching processing is executed by using the plurality of templates in the embodiment.

More specifically, an image area over a predetermined range containing the tracking target subject is extracted from an image input from the image sensor 103 at a given time point and the extracted area is designated as a Current template (a Cur template) in the embodiment. Then, a Large template is created by adjusting the magnification factor of the Cur template to a greater value and a Small template is created by adjusting the magnification factor of the Cur template to a smaller value. These three templates are used as template images.

Figure 2:
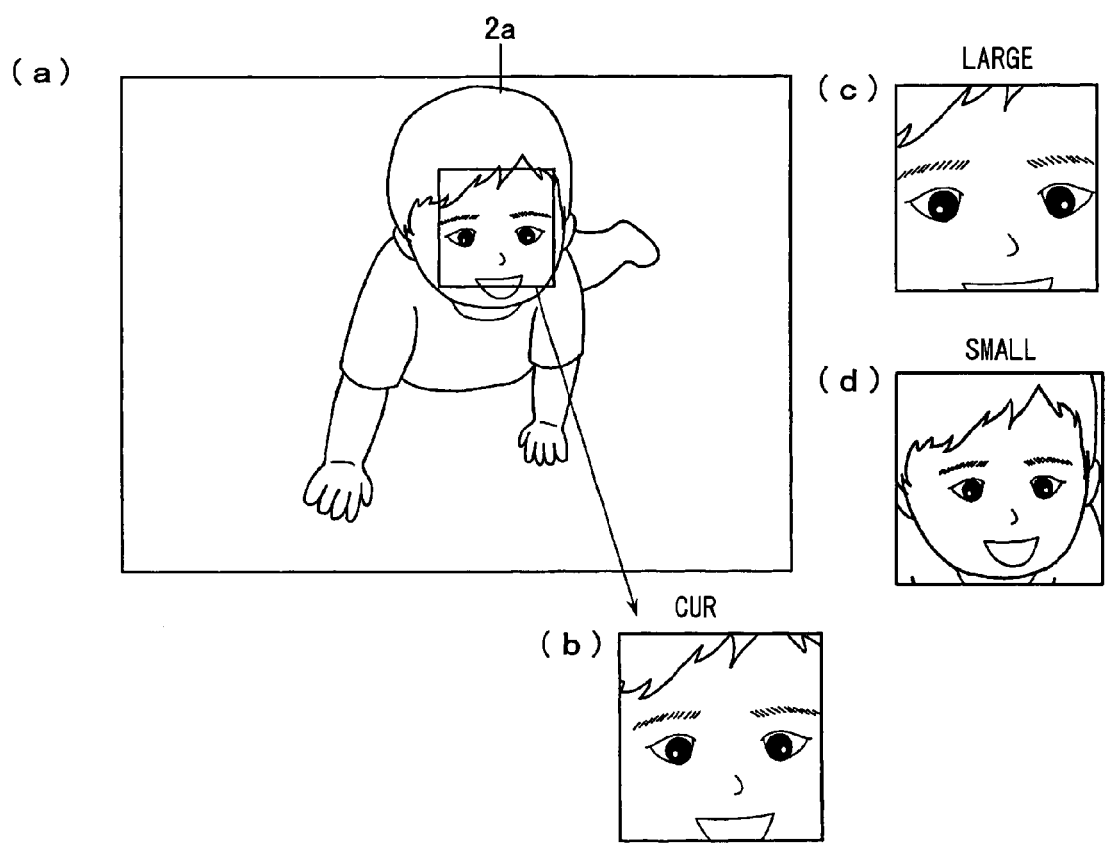
Figure 3:
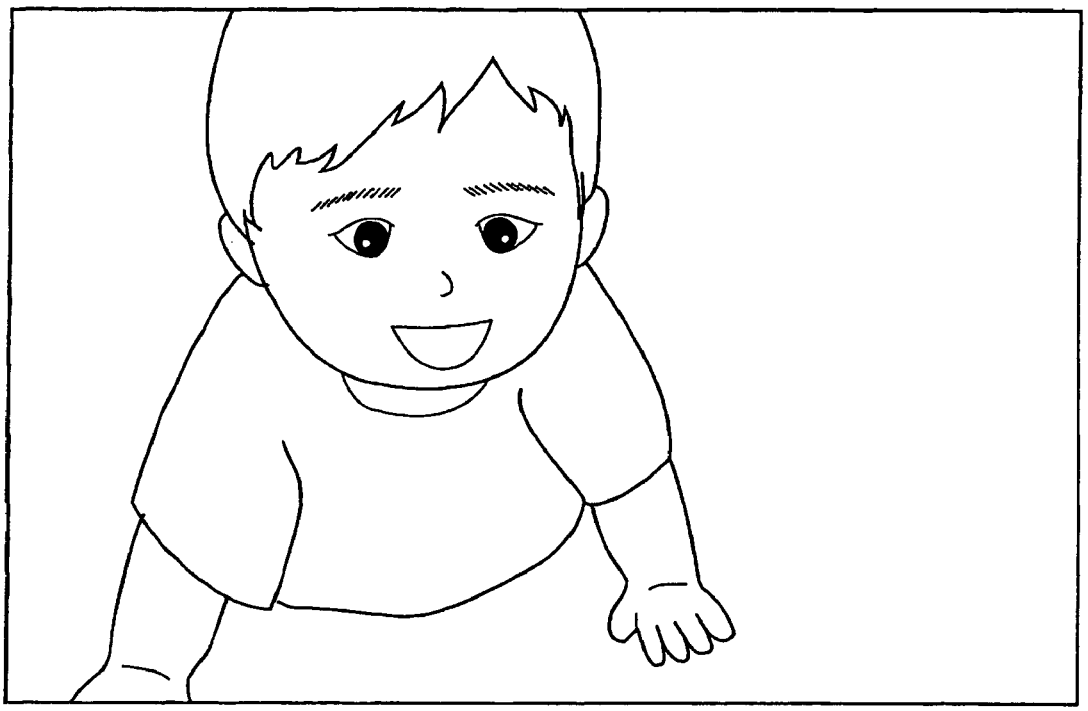

In reference to FIG. 2, specific examples of such template images are described. FIG. 2(*a*) shows an image (target image) input from the image sensor 103 at a given time point, and FIGS. 2(*b*) to 2(*d*) show template images used to enable frame-to-frame tracking of the infant in the target image.

As the user indicates a specific area 2a containing the main subject in the target image in FIG. 2(*a*), the control device 104 extracts the image within the specific area 2a and designates the extracted image as the Cur template, as shown in FIG. 2(*b*). The control device 104 then enlarges the Cur template by a specific magnification factor, e.g., 110%, trims the enlarged image so as to assume a size matching that of the Cur template and thus creates the Large template shown in FIG. 2(*c*). Furthermore, the control device 104 reduces the target image by a predetermined magnification factor, e.g., 91%, and then extracts the image contained within an area matching the size of the Cur template from the Cur template extraction position, thereby creating the Small template shown in FIG. 2(*d*).

The template matching unit 104a executes template matching processing on each of target images input in time series by using these three templates. Consequently, it is ensured that even if the subject in the individual target images assumes varying sizes, the level of similarity between a template image and the corresponding target area is sustained.

For instance, when the subject, moving closer to the camera 100, takes up a greater area in the target image, the level of similarity between the Cur template and the target area will become lower but the level of similarity between the Large template in the target area will increase, assuring a high level of matching accuracy. In addition, when the subject, moving further away from the camera 100 takes up a smaller area in the target image, the level of similarity between the Cur template and the target area will be lowered, but the similarity between the Small template and the target area will increase, assuring high matching accuracy.

In addition, the template update unit 104b in the embodiment updates the template images by re-creating a template image matching the most recent subject size when predetermined conditions to be detailed later exist, so as to assure better matching accuracy in conjunction with a subject assuming varying sizes from one frame to the next. In other words, if the size of the area taken up by the subject in the target image changes as time elapses, the levels of similarity between the target area and the three template images created in advance may all become lowered. However, the template image update achieved via the template update unit prevents such an eventuality, to assure highly accurate matching processing. The following is a description of the template matching processing executed by using the three template images and the template image update processing.

First, the template matching unit 104a executes the template matching processing by using the three template images described earlier on each of the target images in the individual image frames input thereto. Namely, the template matching unit 104a executes template matching for the target area set in the target image in reference to each of the three template images and extracts target areas, each achieving the highest level of similarity with one of the template images, from the target image. In more specific terms, it extracts a target area achieving the highest level of similarity to the Cur template, a target area achieving the highest level of similarity to the Large template and a target area achieving the highest level of similarity to the Small template among the various target areas.

The template matching unit 104a then selects the pair of template image and target area achieving the maximum level of similarity among the template image/extracted target area pairs, and designates the selected template image as a chosen template image and the selected target area as a match-up area. For instance, assuming that the level of similarity calculated for the Cur template and the target area extracted in correspondence to the Cur template is higher than either of the similarity levels calculated for the Large template and the Small template and the corresponding target areas, the template matching unit 104a designates the Cur template as the chosen template and designates the target area extracted in correspondence to the Cur template as the match-up area.

The subject tracking unit 104c tracks the position of the match-up area selected via the template matching unit 104a as described above within the target image from one frame to the next, so as to track the tracking target subject in image frames input from the image sensor 103 in time series, i.e., in dynamic image data. The control device 104 executes photographing operation by using the subject tracking results provided by the subject tracking unit 104c in various types of processing such as AE (auto exposure/automatic exposure adjustment) processing, AF (autofocus/automatic focus adjustment) processing and AWB (auto white balance/automatic white balance adjustment) processing.

For instance, upon detecting that the shutter release switch included in the input switch 101 has been pressed halfway down by the user, the control device 104 executes AE processing so as to achieve the optimal brightness level for the subject being tracked by the subject tracking unit 104c and executes AF processing so as to accurately focus on the subject. It also executes AWB processing in reference to the subject.

The template update unit 104b makes a decision as to whether or not the matching results provided via the template matching unit 104a satisfy the predetermined template update conditions mentioned earlier. More specifically, the template update unit 104b makes a decision as to whether or not the template update conditions exist, depending upon the particular type of chosen template image having been selected, i.e., the Cur template, the Large template or the Small template, as detailed in (a)~(c) below.

(a) The Cur template is selected as the chosen template;

In this case, the template update unit 104b does not update the template images and sustains the current Cur template setting, Large template setting and Small template setting. Namely, based upon the template matching results, the Cur template sustaining the initial magnification factor has been selected as the chosen template. Accordingly, the template update unit judges that the size of the subject in the target image has not changed significantly and that effective template matching can be executed at the current template settings. The template update unit does not, therefore, update the template images.

(b) The Large template is selected as the chosen template;

In this case, provided that the Large template has been selected as the chosen template successively a predetermined number of times or more, e.g., three times or more, and that the average of the similarity levels is equal to or greater than a predetermined similarity level value, e.g., a similarity factor indicating a "match" is 1 and a similarity factor indicating a "mismatch" is 0, the template update unit 104b makes a decision as to whether or not an update condition that the average is equal to or greater than 0.8 is satisfied. Then, upon judging that the update condition is not satisfied, the template update unit 104b does not update the existing template images and sustains the current Cur template, Large template and Small template settings.

If it is decided that the update condition is satisfied, the template update unit 104b judges that since the subject has been gradually assuming a greater area in the images, the template images must be updated in order to sustain the matching accuracy, and updates the template images as described below. Namely, the template update unit 104b increases the template size to 110%, extracts the image in the match-up area at this size, and designates the extracted image as a new Cur template. Then, it enlarges the new Cur template by a specific magnification factor, e.g., 110%, trims the enlarged image to a size matching the size of the Cur template and designates the trimmed image as a new Large template. It also reduces the target image by a specific magnification factor, e.g., 91%, extracts the image contained in an area matching the size of the Cur template at the match-up area position and designates the extracted image as a new Small template.

(c) The Small template is selected as the chosen template;

In this case, the template update unit 104b makes a decision as to whether or not the following update conditions exist; the Small template has been selected as the chosen template successively a predetermined number of times or more, e.g., three times or more, and the similarity level average is equal to or greater than a predetermined similarity level value of, for instance, 0.8. Then, upon judging that the update conditions do not exist, the template update unit 104b does not update the existing template images and sustains the current Cur template, Large template and Small template settings.

If it is decided that the update conditions do exist, the template update unit 104b judges that since the subject has been gradually assuming a smaller area in the images, the template images must be updated in order to sustain the matching accuracy, and updates the template images as described below. Namely, the template update unit 104b decreases the template size to 91%, extracts the image in the match-up area at this size, and designates the extracted image as a new Cur template. Then, it enlarges the new Cur template by a specific magnification factor, e.g., 110%, trims the enlarged image to a size matching the size of the Cur template and designates the trimmed image as a new Large template. It also reduces the target image by a specific magnification factor, e.g., 91%, extracts the image contained in an area matching the size of the Cur template at the match-up area position and designates the extracted image as a new Small template.

Through the template update processing described above, the template images can be updated to optimal images matching the size of the subject moving along the optical axis of the camera 100, to result in a change in the size of the area taken up by the subject in the individual target images. As a result, the template matching unit 104a is able to continuously execute highly accurate matching processing in spite of the change in the size of the area taken up by the subject in the target images.

In addition, the template images are updated only when the update conditions described above exist. Thus, unlike the method used in the related art whereby template images are updated for each frame, the frequency with which the template images are updated is minimized so as to enable stable template matching processing.

Figure 4:
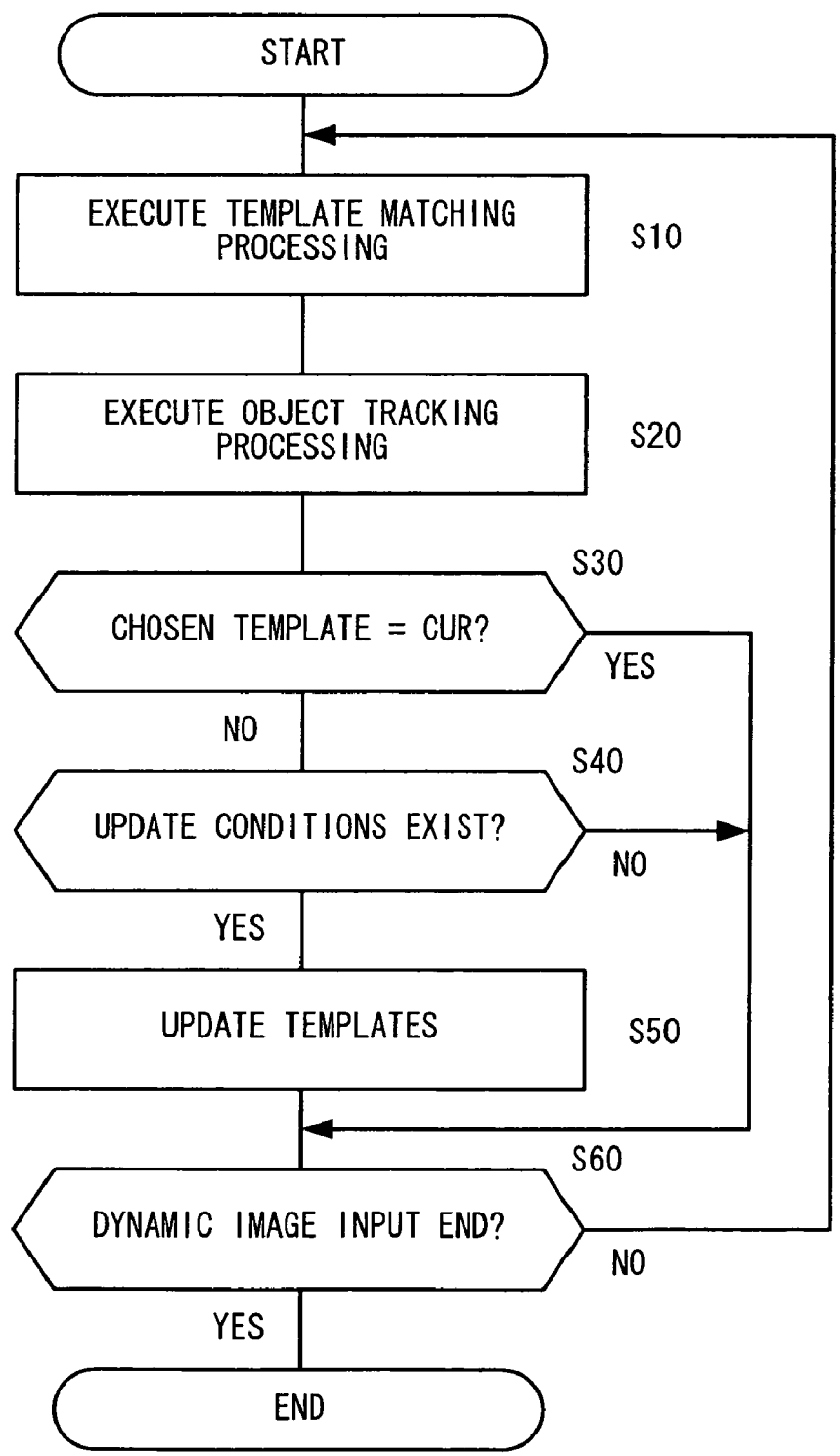

FIG. 4 presents a flowchart of the processing executed in the camera 100 in the first embodiment. The processing in FIG. 4 is executed by the control device 104 based upon a subject tracking program which is started up as a dynamic image photographing operation starts in response to an operation of the input switch 101 by the user.

In step S10, the template matching unit 104a executes the template matching processing to match the image inside the target area with the Cur template, the Large template and the Small template by shifting the target area within the target image as explained earlier. The template matching unit 104a then selects the pair of template image and target area achieving the maximum level of similarity among the template image/target area pairs, and designates the selected template image as the chosen template image and the selected target area as the match-up area. The operation then proceeds to step S20.

In step S20, the subject tracking unit 104c tracks the position of the match-up area selected by the template matching unit 104a within target images from one frame to the next, so as to track the subject through image frames input from the image sensor 103 in time series, i.e., in the dynamic image data.

The operation then proceeds to step S30, in which the template update unit 104b makes a decision based upon the template matching processing results provided by the template matching unit 104a as to whether or not the template selected as the chosen template is the Cur template. If an affirmative decision is made, the operation proceeds to step S60 to be detailed later without the template update unit 104b updating the template images. If a negative decision is made, i.e., if the chosen template is judged to be the Large template or the Small template, the operation proceeds to step S40.

In step S40, the template update unit 104b makes a decision as to whether or not the matching results provided by the template matching unit 104a satisfy the predetermined template update conditions, as explained earlier. Namely, the template update unit 104b determines that the template update conditions exist if the Large template has been selected consecutively a predetermined number of times or more and the similarity level average is equal to or greater than the predetermined similarity level value or if the Small template has been selected consecutively a predetermined number of times or more and the similarity level average is equal to or greater than the predetermined similarity level value.

If a negative decision is made in step S40, the operation proceeds to step S60 to be detailed later without the template update unit 104b updating the template images. However, if an affirmative decision is made, the operation proceeds to step S50. In step S50, the template update unit 104b updates the templates as explained earlier. Namely, the template update unit 104b increases (by 110%) or decreases (by 91%) the template size, extracts the image within the match-up area over the adjusted areal size and designates the extracted image as the new Cur template. Then, it enlarges the new Cur template by a predetermined magnification factor, e.g., 110%, trims the enlarged image so as to achieve a size matching the size of the Cur template and designates the trimmed image as the new Large template. In addition, after reducing the target image by a predetermined magnification factor, e.g., 91%, it extracts the image at the match-up area position over an areal range matching the size of the Cur template, and designates the extracted image as the new Small template.

Subsequently, the operation proceeds to step S60, in which the template matching unit 104a makes a decision as to whether or not the dynamic image data input from the image sensor 103 has ended. If a negative decision is made, the operation returns to step S10 to repeatedly execute the processing described above. If an affirmative decision is made, the processing ends.

The following operational effects can be achieved through the first embodiment described above.
(1) A plurality of template images at various magnification factors are created in advance and template matching processing is executed by using the individual template images. Then, based upon the results of the template matching processing, the template images are updated. Thus, even as the size of a subject moving along the optical axis of the camera 100 changes from frame to frame, highly accurate template matching processing can be continuously executed.
(2) The template images are updated only if the Small template or the Large template is selected consecutively a predetermined number of times or more and the average of the similarity levels having been determined in correspondence to the Small template or the Large template is equal to or greater than the predetermined similarity level value. Thus, unlike the method used in the related art whereby template images are updated for each frame, the frequency with which the template images are updated is minimized so as to enable stable template matching processing.
(3) The plurality of template images created in the embodiment assumes a uniform size and contain images at varying magnification factors. Since all the template images are provided in a uniform size, the load of the processing executed by the template matching unit 104a is reduced.

—Second Embodiment—

In the first embodiment described above, three templates, i.e., the Cur template, the Large template and the Small template, are used in template matching so as to ensure that highly accurate subject tracking is executed even as the subject moves along the optical axis of the camera 100 and the image area occupied by the subject changes from one target image to another. In the second embodiment, a plurality of template images obtained by photographing the tracking target subject at different time points are used in addition to the three template images described earlier. It is to be noted that since the block diagram in FIG. 1, in reference to which the first embodiment has been described, also applies to the second embodiment, a repeated explanation is not provided.

Figure 5:
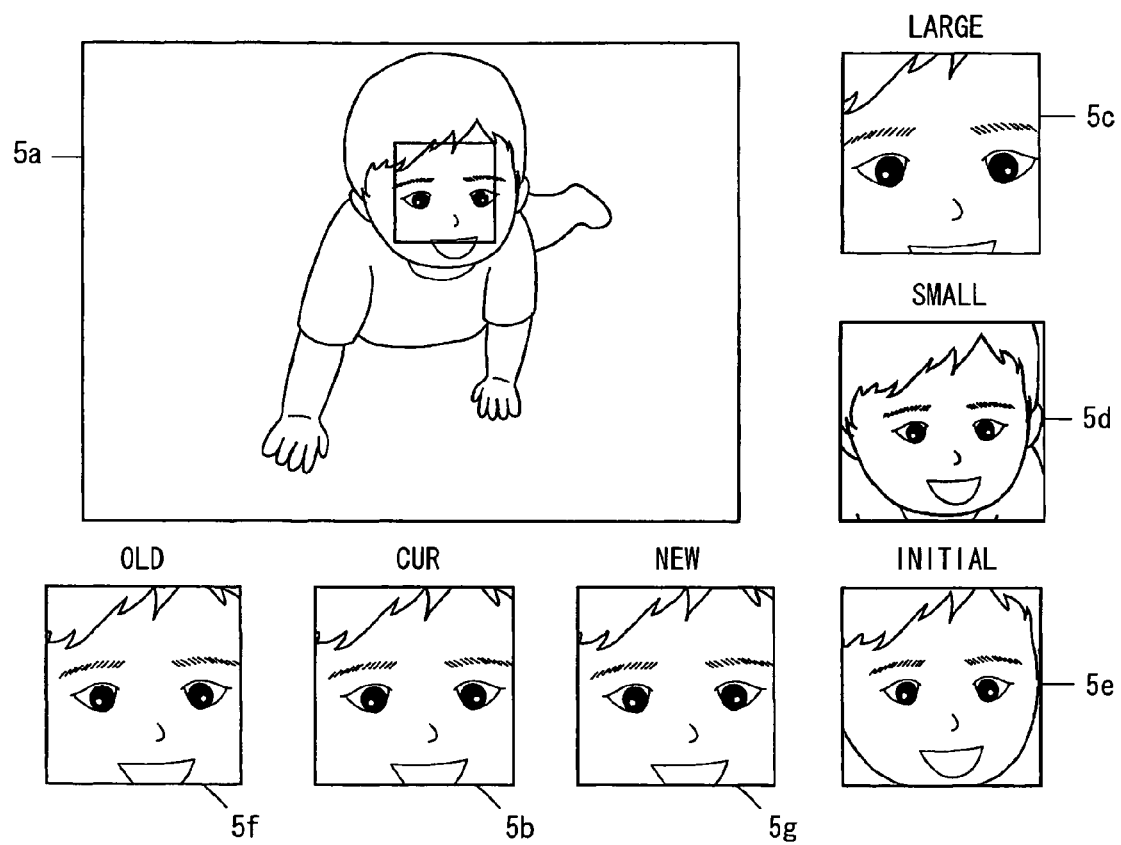

Assuming that the movement of the infant in the target image 5a in FIG. 5 is to be tracked from frame to frame, three images 5e~5g of the subject, i.e., the infant, photographed at various time points (time-lagged template images) are obtained in advance, in the embodiment, in addition to the three templates (magnification factor-varied template images) having been described in reference to the first embodiment, i.e., the Cur template 5b, the Large template 5c and the Small template 5d. Among the template images 5e~5g obtained at varying time points, the template image 5e having been photographed at the earliest time point is designated as "Initial", the template image 5f having been photographed at the next earliest time point is designated as "Old" and the template image 5g having been photographed at the most recent time point is designated as "New".

In addition, the Cur template 5b is a template image captured at a time point following the time point at which the "Old" template 5f was obtained and preceding the time point at which the "New" template 5g was obtained. As in the first embodiment, the Large template 5c and the Small template 5d are created by enlarging and reducing the Cur template 5b.

Namely, the control device 104 obtains four template images captured at different time points, i.e., the "Initial" template 5e, the "Old" template 5f, the Cur template 5b and the "New" template 5g, and generates the Large template 5c and the Small template 5d based upon the Cur template 5b. It is assumed that the "Initial" template 5e, the "Old" template 5f, the Cur template 5b and the "New" template 5g are photographed at different time points by the user in advance.

If the user cannot provide a plurality of images to be used as template images by photographing the subject at different time points in advance, a plurality of simulated template images may be created by using a single photographic image of the subject. For instance, a plurality of simulated template images maybe created by enlarging/reducing the single photographic image of the subject or by adjusting the density of the single photographic image of the subject.

The plurality of template images created through simulation by enlarging/reducing the single photographic image of the subject may include the original photographic image of the subject itself designated as the Cur template 5b, an image obtained by enlarging or reducing the Cur template 5b by a predetermined magnification factor and designated as the "Old" template 5f and an image obtained by enlarging or reducing the Cur template 5b by a magnification factor different from that of the "Old" template 5f and designated as the "New" template 5g.

The plurality of template images created through simulation by adjusting the density of the single photographic image of the subject may include the original photographic image of the subject itself designated as the Cur template 5b, an image obtained by lightening the Cur template 5b and designated as the "Old" template 5f and an image obtained by darkening the Cur template 5b and designated as the "New" template 5g. A method other than those described above may be used in the embodiment to create the plurality of simulated template images.

In the matching processing executed as in the first embodiment to match the target image 5a with the template images, the template matching unit 104a uses the six template images, i.e., the "Initial" template 5e, the "Old" template 5f, the Cur template 5b, the "New" template 5g, the Large template 5c and the Small template 5d. In addition, the template update unit 104b executes update processing to update the template images as described below.

The template matching unit 104a in the first embodiment executes template matching by using the Cur template, the Large template and the Small template. Then, if the matching results provided by the template matching unit 104a satisfy the predetermined template update conditions, the template update unit 104b updates the individual templates. Thus, even as the size of a subject moving along the optical axis of the camera 100 changes from frame to frame, highly accurate template matching processing can be continuously executed.

In the second embodiment, the Cur template 5b, the Large template 5c and the Small template 5d are updated as in the first embodiment and the other template images are updated through the method described below. Consequently, highly accurate template matching can be executed continuously even as the shape of a subject such as a person, moving along a direction different from the direction in which the optical axis of the camera 100 extends or changing its attitude, changes from one image to the next.

In more specific terms, the template update unit 104b does not update the "Initial" template 5e designated as a permanent template image (update-exempt template image). In addition, based upon the results of the template matching processing executed by the template matching unit 104a, the template update unit 104b updates at least one template image among the "Old" template 5f, the Cur template 5b, the "New" template 5g, the Large template 5c and the Small template 5d.

If the results of the template matching processing executed by the template matching unit 104a satisfy the predetermined conditions in one of (a)~(c) having been described in reference to the first embodiment, the template update unit 104b updates the Cur template 5b, the Large template 5c and the Small template 5d as in the first embodiment.

If the template matching processing results provided by the template matching unit 104a satisfy predetermined conditions in one of (a')~(d') below, the template update unit 104b updates the "Old" template 5f, the Cur template 5b and the "New" template 5g. In addition, it re-creates a new Large template 5c and a new Small template 5d based upon the updated Cur template 5b with the timing of the Cur template update. It is to be noted that since the new Large template 5c and Small template 5d are created through a method similar to that having been explained in reference to the first embodiment, a repeated explanation is not provided.

(a') The Cur template 5b is selected as the chosen template;

In this case, the template update unit 104b does not update the template images and sustains the current "Old" template 5f setting, Cur template 5b setting and "New" template 5g setting. Namely, since the template image having been judged to achieve the maximum level of similarity at the time of the previous template update is still judged to achieve the highest level of similarity, the subject is determined to have not moved significantly, and the template images, determined not to require updating are, therefore, not updated.

(b') The "Initial" template 5e is selected as the chosen template;

In this case, the template update unit 104b makes a decision as to whether or not the following update conditions exist; the "Initial" template 5e has been selected as the chosen template successively a predetermined number of times or more, (e.g., seven times or more) and the similarity level average is equal to or greater than a predetermined similarity level value of, for instance, 0.8. Then, upon judging that the update conditions do not exist, the template update unit 104b does not update the existing template images and sustains the current "Old" template 5f, Cur template 5b and "New" template 5g settings.

If it is decided that the update conditions do exist, the template update unit 104b updates the template images as described below. Namely, it designates the template image currently set as the Cur template 5b as the "Old" template 5f and designates the template image currently set as the "Initial" template 5e as the Cur template 5b. In addition, it takes in the image within the match-up area and designates it as a "New" template 5g. It is to be noted that the update-exempt template image, i.e., the template image set as the "Initial" template 5e is not updated.

As a result, the template image judged to achieve the highest level of similarity is designated as the Cur template 5b and the previous Cur template 5b is designated as the "Old" template 5f. At the same time, the template update unit 104b takes in the image within the target area judged to have the highest level of similarity to the pre-update "Initial" template 5e in the target image 2a, i.e., the image within the match-up area and designates the image thus taken in as the new "New" template 5g.

(c') The "Old" template 5f is selected as the chosen template;

In this case, the template update unit 104b makes a decision as to whether or not the following update conditions exist; the "Old" template 5f has been selected as the chosen template successively a predetermined number of times or more, e.g., seven times or more, and the similarity level average is equal to or greater than 0.8. Then, upon judging that the update conditions do not exist, the template update unit 104b does not update the existing template images and sustains the current "Old" template 5f, Cur template 5b and "New" template 5g settings.

If it is decided that the update conditions do exist, the template update unit 104b updates the template images as described below. Namely, it designates the template image currently set as the "Old" template 5f as the Cur template 5b and designates the template image currently set as the Cur template 5b as the "Old" template 5f.

As a result, the template image judged to achieve the highest level of similarity is designated as the Cur template 5b and the previous Cur template 5b is designated as the "Old"

template 5f. At the same time, the template update unit 104b takes in the image within the target area judged to have the highest level of similarity to the pre-update "Old" template 5f in the target image 2a, i.e., the image within the match-up area and designates the image thus taken in as a new "New" template 5g.

(d') The "New" template 5g is selected as the chosen template;

In this case, the template update unit 104b makes a decision as to whether or not the following update conditions exist; the "New" template 5g has been selected as the chosen template successively a predetermined number of times or more, e.g., seven times or more, and the similarity level average is equal to or greater than 0.8. Then, upon judging that the update conditions do not exist, the template update unit 104b does not update the existing template images and sustains the current "Old" template 5f, Cur template 5b and "New" template 5g settings.

If it is decided that the update conditions do exist, the template update unit 104b updates the template images as described below. Namely, it designates the template image currently set as the "New" template 5g as the Cur template 5b and designates the template image currently set as the Cur template 5b as the "Old" template 5g.

As a result, the template image judged to achieve the highest level of similarity is designated as the Cur template 5b and the previous Cur template 5b is designated as the "Old" template 5f. At the same time, the template update unit 104b takes in the image within the target area judged to have the highest level of similarity to the pre-update "New" template 5g in the target image 2a, i.e., the image within the match-up area and designates the image thus taken in as a new "New" template 5g.

By updating the plurality of template images having been obtained at different time points as described above, highly accurate template matching processing can be executed even as the subject moves and the shape of the subject changes from one image to the next. In addition, the template images are updated only if the "Initial" template 5e, the "Old" template 5f or the "New" template 5g is selected consecutively a predetermined number of times or more and the average of the similarity levels having been determined in correspondence to the chosen template is equal to or greater than the predetermined similarity level value. Thus, unlike the method used in the related art whereby template images are updated for each frame, the frequency with which the template images are updated is minimized so as to enable stable template matching processing.

For instance, assuming that the target dynamic image is constituted with 600 frames of still images and the template images are updated in correspondence to each frame through the method in the related art, the template images will need to be updated 600 times. However, by adopting the methods explained in reference to the embodiment, the number of times the template images are updated can be reduced to approximately 30 and, as a result, the processing load can be reduced.

The processing executed in the camera 100 in the second embodiment is now described in reference to the flowchart presented in FIG. 4. The processing in FIG. 4 is executed by the control device 104 based upon a subject tracking program which is started up as a dynamic image photographing operation starts in response to an operation of the input switch 101 by the user. It is to be noted that the following explanation focuses on the difference from the processing executed in the first embodiment having been described earlier and that the processing identical to that executed in the first embodiment is not described below.

If a negative decision is made in step S30, i.e., if it is decided that the chosen template is any one of; the Large template 5c, the Small template 5d, the "Initial" template 5e, the "Old" template 5f and the "New" template 5g, the operation proceeds to step S40.

In step S40, the template update unit 104b makes a decision as to whether or not the matching results provided by the template matching unit 104a satisfy the predetermined template update conditions, as explained earlier. If it is decided that update conditions exist, the template update unit 104b updates the template images as has been explained earlier. Namely, the template update unit 104b updates the individual template images by adopting the update method in conjunction with the update conditions (a)~(c) described in reference to the first embodiment and adopting the update method in conjunction with the update conditions (a')~(d') described in reference to the second embodiment.

In addition to the advantages of the first embodiment, the following operational effects can be achieved through the second embodiment described above.

(1) A plurality of template images captured at different time points are created in advance and template matching processing is executed by using the individual template images. Then, based upon the results of the template matching processing, the template images are updated. Thus, even as the shape of a subject, shifting its position or attitude from frame to frame changes, highly accurate template matching processing can be continuously executed.

(2) The template images are updated only if the "Initial" template 5e, the "Old" template 5f or the "New" template 5g is selected consecutively a predetermined number of times or more and the average of the similarity levels having been determined in correspondence to the chosen template is equal to or greater than the predetermined similarity level value. Thus, unlike the method used in the related art whereby template images are updated for each frame, the frequency with which the template images are updated is minimized so as to enable stable template matching processing.

(3) If a plurality of images of the subject photographed at different time points cannot be obtained in advance to be used as template images, a plurality of simulated template images are created by using a single photographed image of the subject. Thus, even under circumstances in which a plurality of template images cannot be obtained in advance by photographing the subject at different time points, the subject can still be tracked through the template matching processing according to the present invention.

(4) The "Initial" template 5e is designated as the update-exempt permanent template. As a result, accumulation of erroneous information, which tends to readily occur during dynamic template image update processing, is prevented.

—Variations—

It is to be noted that the cameras having been described in reference to the embodiments allow for the following variations.

(1) In the first embodiment, three template images, i.e., the Cur template, the Small template and the Large template are used. In the second embodiment, a total of six template images, i.e., the "Initial" template, the "Old" template and the "New" template in addition to the three template images used in the first embodiment, are used. However, the number of template images that may be used in conjunction with the present invention are not limited to these examples. For instance, an additional image assuming a magnification factor different from those of the Cur template, the Small template and the Large template may be used both in the first embodiment and in the second embodiment.

In addition, only the "Old" template may be used in addition to the Cur template, the Small template and the Large template in the second embodiment. In such a case, when the "Old" template is selected as the chosen template and the update conditions are satisfied, the template image currently set as the "Old" template should be designated as the Cur template and the image contained within the target area should be set as the "Old" template area. If the Cur template is selected as the chosen template, the template images should not be updated. In addition, if the template matching processing is executed in conjunction with seven or more template images, a plurality of images should be designated as "Old" templates by using the Cur template from several generations previous as a template image.

(2) In the first and second embodiments described above, the template update unit 104*b* makes a decision as to whether or not the template image update conditions exist based upon the criteria that the Small template, the Large template, the "Old" template or the "New" template has been selected consecutively a predetermined number of times or more and that the average of the levels of similarity determined in correspondence to the chosen template is equal to or greater than the predetermined similarity level value. However, the present invention is not limited to this example and instead, the decision as to whether or not the update conditions exist may be made based upon alternative criteria that any of these template images has been selected consecutively a predetermined number of times or more and that the levels of similarity determined in correspondence to the chosen template are all equal to or greater than a predetermined similarity level value. As a further alternative, a single update condition, i.e., a specific template image has been selected as the chosen template consecutively a predetermined number of times or more, may be imposed with regard to the template image update to be executed by the template update unit 104*b*.

(3) In the first and second embodiments described above, the target data undergoing the template matching processing and the subject tracking processing are dynamic image data input from the image sensor 103, i.e., image data over a plurality of frames input in time series. However, the present invention is not limited to this example and it may be adopted in frame-to-frame tracking of a subject in a plurality of still images input in time series by engaging a continuous shooting function as well.

(4) In the first and second embodiments described above, the camera 100 embodies the subject tracking device and the control device 104 in the camera 100 executes the subject tracking program. However, another device may be utilized as the subject tracking device. For instance, a personal computer may be used as the subject tracking device, the subject tracking program may be recorded in a recording medium such as a hard disk in the personal computer and the CPU may execute the subject tracking program read into the memory thereof. In addition, a security system (surveillance system) that monitors conditions inside a given facility may be used as the subject tracking device.

Figure 6:
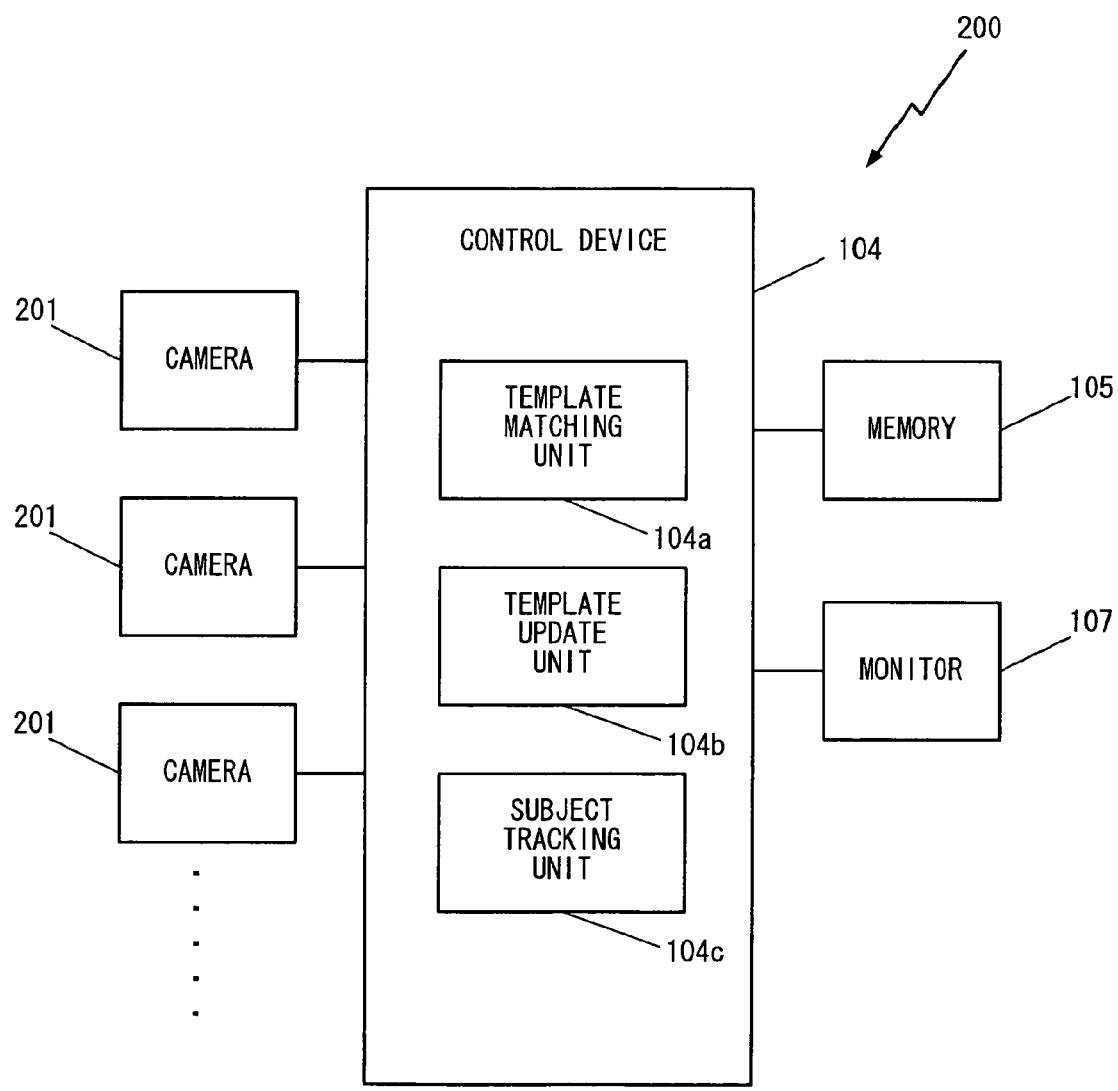

For instance, the present invention may be adopted in a security system 200 equipped with a plurality of cameras 201, a control device 104, a memory 105 and a monitor 107, as shown in FIG. 6. The control device 104 in this system may execute frame-to-frame subject tracking for images input from the cameras 201 in time series based upon a subject tracking program similar to those explained in reference to the first and second embodiments, in order to identify an intruder in the facility. The system may include a plurality of monitors 107 so as to monitor the conditions in the facility via the plurality of monitors 107. In addition, the subject tracking device according to the present invention may be embodied as a portable telephone equipped with a camera or the like, as well.

(5) In the first and second embodiments described above, the control device 104 creates the Large template by enlarging the Cur template by a predetermined magnification factor and creates the Small template by reducing the Cur template by a predetermined magnification factor. Instead, the Large template and the Small template may be created by enlarging and reducing another template image. For instance, the control device 104 may create the Large template by enlarging the "New" template by a predetermined magnification factor and create the Small template by reducing the "New" template by a predetermined magnification factor.

Figure 7:
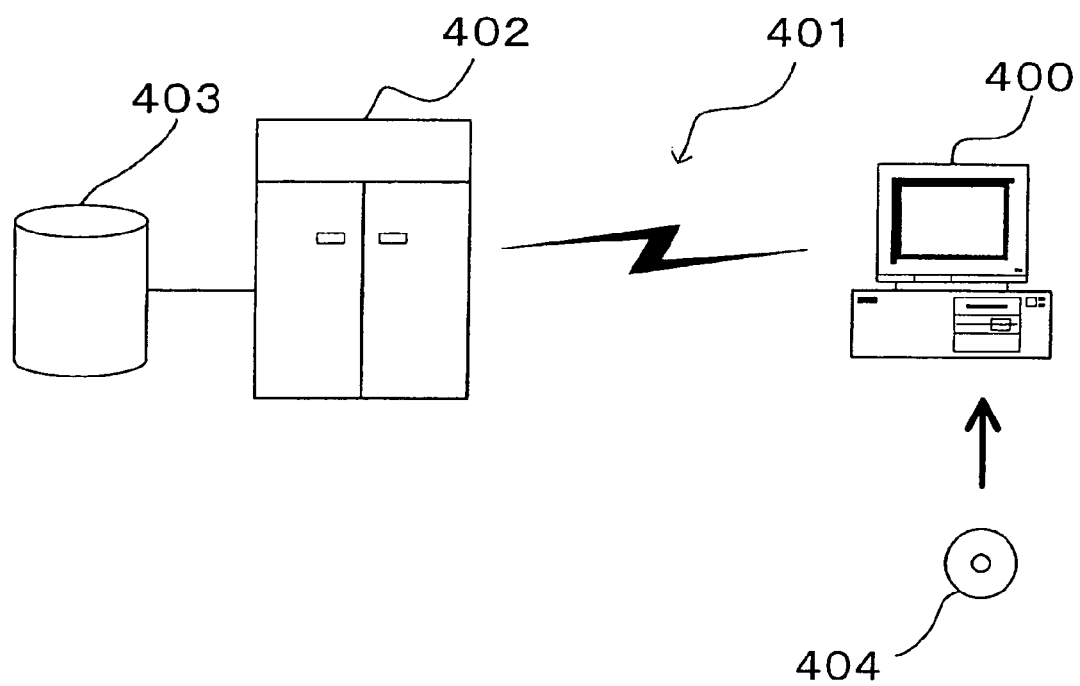

(6) In addition, when the present invention is adopted in a personal computer or the like, the subject tracking program may be provided to the personal computer via a recording medium such as a CD-ROM or via data signals exchanged on the Internet or the like. FIG. 7 illustrates how the program may be provided through such media. A personal computer 400 receives the program via a CD-ROM 404. The personal computer 400 also has a connection capability to connect with a communication line 401. A computer 402 is a server computer that provides the program stored in a recording medium such as a hard disk 403. The communication line 401 may be a communication network such as the Internet or another type of personal computer communication network, or it may be a dedicated communication network. The computer 402 reads out the program from the hard disk 403 and transmits the program thus read out to the personal computer 400 via the communication line 401. Namely, the program may be embodied as a data signal on a carrier wave and transmitted via the communication line 401. In short, the program can be distributed as a computer-readable computer program product assuming any of various modes such as a recording medium and a carrier wave.

While the invention has been particularly shown and described with respect to preferred embodiments and variations thereof by referring to the attached drawings, the present invention is not limited to these examples and it will be understood by those skilled in the art that various changes in form and detail maybe made therein without departing from the scope and teaching of the invention.

The disclosure of the following priority application is herein incorporated by reference:

Japanese Patent Application No. 2007-68801 filed Mar. 16, 2007

The invention claimed is:

1. A non-transitory computer-readable storage medium that stores a computer-readable program for tracking movement of a subject through a plurality of input images input in time series, wherein:

the subject tracking program enables a computer to execute:

a template matching step through which each input image is matched with a plurality of template images at various magnification factors through template matching, a template image among the plurality of template images achieving a highest level of similarity to an image within a specific area in the input image is selected as a chosen template image and the specific area in the input image is extracted as a match-up area;

a decision step through which a decision is made as to whether or not matching results obtained through the template matching step satisfy an update condition for updating the plurality of template images; and an update step through which at least one of the plurality of template images is updated upon deciding through the decision step that the update condition is satisfied;

wherein:

the plurality of template images include a current chosen template image selected as the chosen template image as the plurality of template images are updated through the update step, an enlarged template image obtained by enlarging the current chosen template image by a predetermined magnification factor and a reduced template image obtained by reducing the current chosen template image by a predetermined magnification factor; and in the decision step, the decision as to whether or not the update condition is satisfied is made based upon a criterion the either the enlarged template image or the reduced template image has been consecutively selected as the chosen template image a predetermined number of times or more.

2. The non-transitory computer-readable storage medium according to claim 1, wherein:

in the decision step, the decision as to whether or not the update condition is satisfied is made based upon an additional criterion that levels of similarity determined in correspondence to either the enlarged template image or the reduced template image having been consecutively selected as the chosen template image the predetermined number of times or more, are all equal to or greater than a predetermined similarity level value or that an average of the levels of similarity is equal to or greater than the predetermined similarity level value.

3. The non-transitory computer-readable storage medium according to claim 1, wherein:

the plurality of template images at various magnification factors are either a plurality of template images of uniform template image size, each obtained by adjusting an image magnification factor alone, or a plurality of template images each obtained by adjusting the image magnification factor and assuming a template image size adjusted in correspondence to the adjusted magnification factor.

4. A subject tracking device comprising:

an execution unit that executes the program contained in the non-transitory computer-readable storage medium according to claim 1.

5. A camera comprising:

an imaging unit that captures a subject image and outputs image signals; and an execution unit that executes the program contained in the non-transitory computer-readable storage medium according to claim 1.

6. A non-transitory computer-readably storage medium that stores a computer-readable program for tracking movement of a subject through a plurality of input images input in time series, wherein:

the subject tracking program enables a computer to execute:

a template matching step through which each input image is matched through template matching with a plurality of template images including a plurality of template images (magnification factor-varied template images) at various magnification factors and a plurality of template images (time-lagged template images) obtained at different time points, a template image among the plurality of template images achieving a highest level of similarity to an image within a specific area in the input image is selected as a chosen template image and the specific area in the input image is extracted as a match-up area;

a decision step through which a decision is made as to whether or not matching results obtained through the template matching step satisfy an update condition for updating the plurality of template images; and an update step through which at least one of the plurality of template images is updated upon deciding through the decision step that the update condition is satisfied, wherein:

the plurality of magnification factor-varied template images include a current chosen template image selected as the chosen template image as the plurality of template images as updated through the update step, an enlarged template image obtained by enlarging the current chosen template image by a predetermined magnification factor and a reduced template image obtained by reducing the current chosen template image by a predetermined magnification factor;

the plurality of time-lagged template images include a previous chosen template image having been set as the current chosen template image until the plurality of template images are updated through the update step, a new chosen template image constituted with an image contained in the match-up are when the plurality of template images are updated through the update step and an update-exempt template image having been obtained at an earliest time point among the plurality of template images, which is not updated through the update step; and in the decision step, the decision as to whether or not the update condition is satisfied is made based upon a criteria that any one of the previous chosen template image, the new chosen template image, the enlarged template image, the reduced template image and the update-exempt template image has been consecutively selected as the chosen template image a predetermined number of times or more.

7. The non-transitory computer-readable storage medium according to claim 6, wherein:

the plurality of magnification factor-varied template images further include the new chosen template image, an enlarged template image obtained by enlarging the new chosen template image by a predetermined magnification factor and a reduced template image obtained by reducing the new chosen template image by a predetermined magnification factor.

8. The non-transitory computer-readable storage medium according to claim 6, wherein:

in the decision step, the decision as to whether or not the update condition is satisfied is made based upon an additional criterion that levels of similarity determined in correspondence to any one of the previous chosen template image, the new chosen template image, the enlarged template image, the reduced template image and the update-exempt template image having been consecutively selected as the chosen template image the predetermined number of times or more are all equal to or greater than a predetermined similarity level value or that an average of the levels of similarity is equal to or greater than a predetermined similarity level value.

9. The non-transitory computer-readable storage medium according to claim 6, wherein:

the plurality of template images at various magnification factors are either a plurality of template images of uniform template image size, each obtained by adjusting an image magnification factor alone, or a plurality of template images each obtained by adjusting the image magnification factor and assuming a template image size adjusted in correspondence to the adjusted magnification factor.

10. A subject tracking device comprising:

an execution unit that executes the program contained in the non-transitory computer-readable storage medium according to claim 6.

11. A camera comprising:

an imaging unit that captures a subject image and outputs image signals; and an execution unit that executes the program contained in the non-transitory computer-readable storage medium according to claim 6.

* * * * *